United States Patent [19]

Bush

[11] 4,226,655
[45] Oct. 7, 1980

[54] METHOD FOR BUILDING A TIRE

[75] Inventor: John R. Bush, Akron, Ohio

[73] Assignee: The B. F. Goodrich Company, Akron, Ohio

[21] Appl. No.: 394

[22] Filed: Jan. 2, 1979

[51] Int. Cl.$^3$ .................. B29H 17/24; B60C 15/06
[52] U.S. Cl. ........................ 156/132; 152/362 CS
[58] Field of Search .................... 152/362, 362 CS; 156/110 R, 123 R, 131, 132, 133

[56] References Cited

U.S. PATENT DOCUMENTS

| | | | |
|---|---|---|---|
| 2,713,382 | 7/1955 | Bosomworth et al. | 152/362 R |
| 2,947,341 | 8/1960 | Hershey | 152/362 CS |
| 2,947,343 | 8/1960 | Sjothun | 152/362 CS |
| 3,003,537 | 10/1961 | Engstrom et al. | 152/362 R |

FOREIGN PATENT DOCUMENTS

| | | | |
|---|---|---|---|
| 203260 | 1/1956 | Australia | 152/362 CS |
| 1042613 | 6/1953 | France | 152/362 CS |

*Primary Examiner*—John E. Kittle
*Attorney, Agent, or Firm*—Joe A. Powell

[57] ABSTRACT

An improved tire building method is provided whereby the nonwicking finishing strip is placed on the building drum first before the remaining components are applied to the drum. Once the carcass plies and the bead core are positioned on the drum, the finishing strip is turned up around the bead core to effectively seal off the inflation chamber of the tire. The method of this invention is especially useful for tires built on flat cylindrical drums.

4 Claims, 5 Drawing Figures

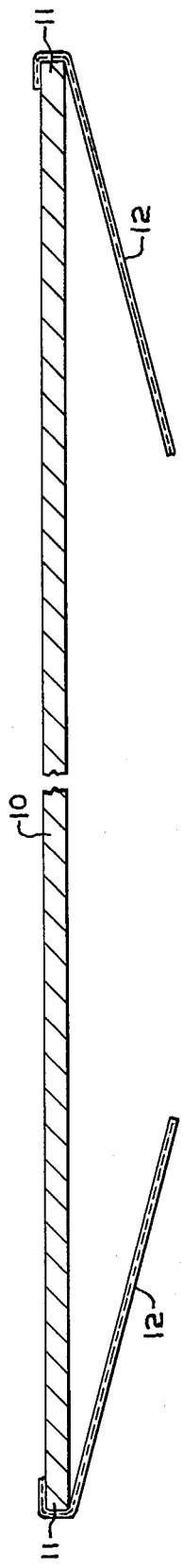
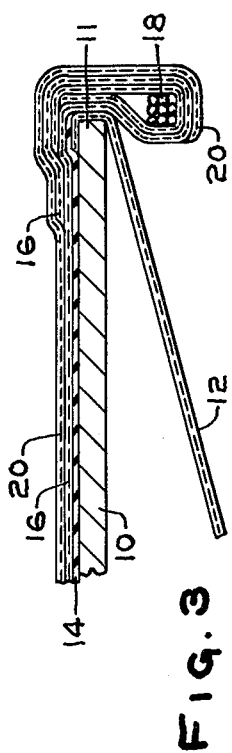
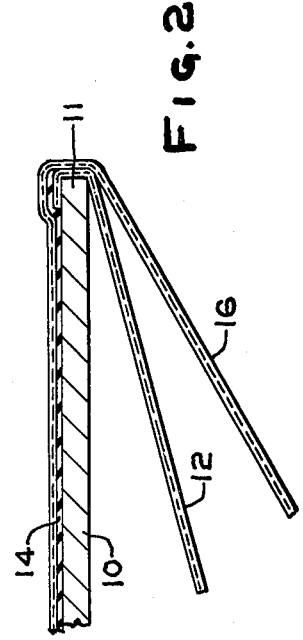
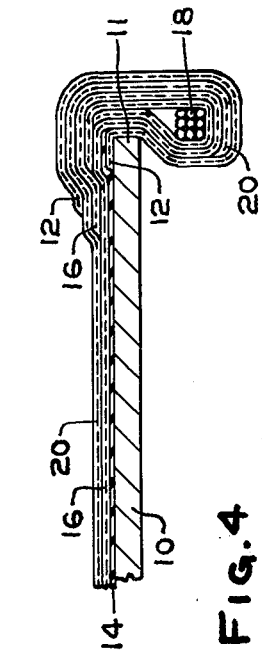
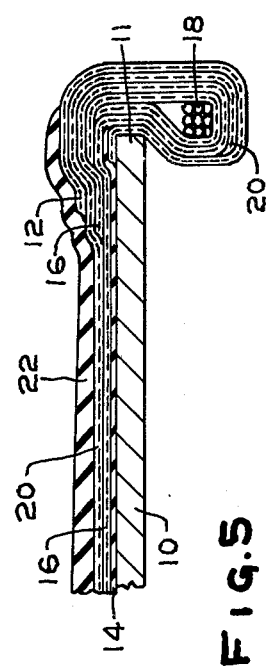

METHOD FOR BUILDING A TIRE

BACKGROUND OF THE INVENTION

Pneumatic tires have been built on flat cylindrical drums for many years. With the advent of tubeless tires, it became necessary to use a nonwicking finishing strip, also known as a chaffer strip, around the bead area of the tire. This nonwicking finishing strip serves the dual function of protecting the carcass reinforcement cords from damage by the rim and also to seal the tire chamber from air loss.

In a conventional tire building process, the tire is built up on a drum by first applying the air impervious liner and then applying the first ply of the carcass. The bead assembly is then set and the first ply is turned up around the bead. The second ply is then applied and turned down around the bead. The next step is to apply the nonwicking finishing strip and turn it down around the bead. The finishing strip should turn down far enough to cover the edge of the air impervious liner so as to prevent the inflation gas from contacting the reinforcing carcass ply. If the inside reinforcing carcass ply is exposed to the inflation gas, a leaker will result. A leaker is a tire which slowly loses its inflation pressure. A tire which slowly leaks into the carcass plies can cause serious problems by building up pressure at the carcass-tread interface. This pressure buildup can increase the probability of a tire throwing its tread off during service.

When using the conventional building sequence mentioned above, it is difficult to turn the nonwicking finishing strip down far enough to ensure that it overlaps the air impervious liner. The turndown edge of the nonwicking finishing strip will often wrinkle, thus, not covering completely the edge of the air impervious liner.

This problem has been alleviated in many tires by using what is called an under-cut building drum. In an under-cut drum, the bead area of the drum is smaller in diameter than the crown portion of the drum. This type of drum enables the tire builder to more easily make a larger turndown. However, when using a flat drum, the problem still exists. This invention alleviates this problem and results in a positive placement of the nonwicking strip in its desired location when built on a flat drum.

SUMMARY OF THE INVENTION

This invention provides an improved method for building tubeless tires on a flat cylindrical drum. In the improved method of this invention, the nonwicking finishing strip is placed on the building drum first such that a major portion of the finishing strip extends out past the outer edge of the drum. The extended portion is then tucked back under the drum surface so as to be positioned out of the way for the remaining tire building steps. After the beads are positioned and the reinforcing plies are laid up on the drum, the finishing strip is turned up around the beads to effectively seal off the air chamber of the tire. This improved tire building method results in a tire of improved quality by assuring against leaks in the bead area of the tire. This invention is particularly useful for tires which must be produced on flat drums and be of high quality such as aircraft tires.

BRIEF DESCRIPTION OF THE DRAWINGS

The figures show a fragmentary cross-sectional view of a flat cylindrical tire building drum together with the sequential steps of building a complete tire on said drum.

FIG. 1 is a fragmentary cross-sectional view of a flat cylindrical tire building drum showing the nonwicking finishing strip placement on the building drum.

FIG. 2 is an enlarged fragmentary cross-sectional view of a tire building drum having the nonwicking finishing strip, the air impervious liner, and the first carcass ply reinforcement placed on the drum.

FIG. 3 is an enlarged fragmentary cross-sectional view of a tire building drum showing the further steps of bead assembly placement and the second carcass ply reinforcement placed on the drum.

FIG. 4 is an enlarged fragmentary cross-sectional view of a tire building drum showing the further step of turning the finishing strip up around the bead assembly.

FIG. 5 is an enlarged fragmentary cross-sectional view of a completed tire on a tire building drum.

DETAILED DESCRIPTION

The invention provides an improved method by which tubeless tires may be built on a flat cylindrical drum 10. The method of this invention results in a tire with much less likelihood of having a slow leak in the bead area of the tire. The invention is illustrated in the accompanying drawing and will be described with reference to the manner in which it is employed to produce a bias ply tubeless tire of the type suitable for use on an aircraft. It is to be understood, however, that the invention can be employed in building tubeless tires for other types of vehicles and uses.

The tire building drum 10 which is employed is conventional and hence, is not illustrated or described in detail. Such a drum, as is well known, is mounted for rotation about a horizontal axis and generally comprises several segments that can be moved relative to each other to facilitate removal therefrom, in the generally cylindrical form, of an uncured tire that has been assembled thereon by sequential application of appropriate components. The tire building drum 10 shown is known as a flat drum. If an undercut drum were employed, then the advantages of this invention would not be as great as they are with a flat drum.

Throughout the several views, like reference numerals designate like or corresponding parts. As shown in FIGS. 1 through 5, the tire is built in sequential steps. In FIG. 1 a pair of nonwicking finishing strips 12 are applied to edge 11 of building drum 10 such that said finishing strips are contacting the outer surface of drum 10. The strips 12 are axially spaced such that a minor portion contacts drum 10 and a major portion of said strips extend outward from the edge 11 of drum 10. The amount of contact between strips 12 and drum 10 may vary, however, usually a contact width of from about 0.1 inch to about 1.0 inch is desirable. To facilitate strips 12 adhering to drum 10 during the tire building process, it is usually preferred to apply a rubber cement to drum 10 in the area where the strips 12 contact drum 10. This cement is commonly referred to as drum cement and its use is well known in the art of tire building.

After the strips 12 are applied to drum 10, they are tucked or folded around the edge of drum 10 and back underneath the surface of drum 10 (as is shown in FIG. 1) so as to be positioned out of the way for the remaining building steps. The major portion of said finishing strip is nearer to the horizontal axis of said drum than said minor portion of said finishing strip.

The nonwicking finishing strips used in the invention are of the type which is well known in the art. The most common being a rubber coated square woven fabric (usually nylon) which has the void areas of the cord saturated with cord dip. Other suitable materials may be used for the finishing strip 12 including rubber coated monofiliment textiles, tough rubber compounds and the like which are well known in the art. The only essential feature of finish strips 12 is that they be nonwicking, that is they will not wick tire inflation gas. Some tires may require multiple layers of nonwicking finishing strips 12.

Referring to FIG. 2, after the finishing strips 12 have been applied to drum 10 and tucked or folded around the edge of the drum 10, the next step in tire building is to apply the air impervious liner 14. The view in all figures except FIG. 1 show only one edge of the tire as it is being built. The other side of the tire would be identical to that shown. Air impervious liner 14 is applied to drum 10 and is positioned such that it overlaps finishing strip 12. The amount of overlap may vary, however, usually about 0.1 inch to 1.0 inch overlap is desirable. The air-impervious liner 14 is usually a rubber compound which contains some butyl or halogenated butyl rubber. Air-impervious liners which are suitable for making tubeless tires are well known in the art. The liner 14, may be formed in layers of different rubber compounds as is well known.

The next sequential step (FIG. 2) is to apply a body layer comprising one or more carcass reinforcing plies 16. The reinforcing ply 16 is disposed upon the drum 10 in the form of an annulus the edges of which project beyond the ends of the drum 10. The carcass ply or plies 16 consists of rubber coated fabric. The fabric used may be nylon, polyester, rayon, steel or any other fabric which is suitable for tire carcass reinforcement. After application to drum 10, the carcass ply 16 is folded down around the edge of drum 10 as is shown in FIG. 2. The carcass ply 16 shown is cut such that the cords run at an angle to the axis of rotation of the building drum 10. The cord angle of ply 16 is that which is common to bias ply tires.

Referring to FIG. 3, the next sequential step is to apply annular reinforcements 18, commonly known as bead cores. The annular reinforcements 18 are applied over each axially outer edge of the reinforcing ply or plies 16 and the edges of the latter turned up about the bead cores 18. Bead cores 18 may include appropriate filler strips and/or flippers which are well known in the art. The next sequential step is to apply another body layer comprising one or more reinforcing ply or plies 20 and turn down said reinforcing ply 20 around bead core 18. Ply 20 has its cords running at an angle opposite those of ply 16.

Referring to FIG. 4, the next sequential step is to loosen the nonwicking finishing strips 12 from where they were tucked back under the drum and turn the finishing strip 12 up around the bead core 18. The finishing strip 12 in its final placement covers the edge of the air-impervious liner 14 and the edge of reinforcing ply 20.

Referring to FIG. 5, the next sequential step is to apply a rubber cover material 22 which is commonly referred to as the tread and sidewall rubber layer to the building drum 10 external of said body layers. The rubber layer 22 is positioned such that it overlaps the turned up edge of finishing strip 12. FIG. 5 shows a completed tire on a building drum. The completed uncured tire is then removed from the building drum and vulcanized into a toroidal configuration in a suitable curing press to form a tire suitable for its designed service. The steps of removing the tire from the drum and vulcanizing the tire have not been described here since they are well known in the art.

The prior art method of building a tire is to apply the finishing strips 12 after the liner 14, carcass ply 16, bead core 18 and carcass ply 20 have been applied. If the finishing strip 12 were removed from FIG. 3, this would represent the tire at this stage using the prior art method. According to the prior art method, the finishing strip would be appied to the drum and turned down around the bead. As can be seen from the drawings, it would be difficult to turn the finishing strip down far enough to have it overlap the air-impervious liner when using a flat drum. With the prior art method of applying the finishing strip after the application of the carcass plies and the bead, it is difficult to control the placement where the finishing strip ends on the inside of the tire. When attempts are made to turn fabric down around the bead, there is also a likelihood of wrinkling the fabric thus causing defects in the finished tire. These problems are solved by this invention.

This invention has been illustrated above by detailing the steps involved in making a tubeless two ply bias, single bead (one bead each side) tire. This is only one possible tire to make according to this invention. This invention is applicable to tires having one ply or greater than one ply and to radial as well as bias tires. In radial tires the body layer would have cords substantially axially oriented upon drum 10. Tires having more than one bead core on each side may also be made according to this invention. Multiple bead tires are often used on large airplanes, trucks and off-the-road equipment. Where radial tires are produced by the method of this invention, the belts and tread would normally be applied in a second stage building operation as is well known in the art.

Although a specific embodiment of the invention has been hereinbefore described, it is understood that the subject invention is not limited thereto since variations and modifications thereof can be made without departing from the principles of the invention.

I claim:
1. The method of making a tubeless pneumatic tire comprising the sequential steps of:
   (a) assembling upon a cylindrical drum at least two axially spaced nonwicking finishing strips, wherein a minor portion of the width of said finishing strip is contacting the outer surface of said drum;
   (b) folding a major portion of the width of said finishing strip down such that said major portion is nearer to the horizontal axis of said drum than said minor portion of said finishing strip;
   (c) applying a layer of air-impervious liner to said drum, wherein said liner extends over the edge of said minor portion of said finishing strip;
   (d) applying a first body layer comprising at least one ply of rubber coated cord fabric and folding said fabric down to cover the outer edges of said drum;
   (e) applying a bead core over each axially outer edge of the first body layer at either end of said drum and turning each of said edges up over the respective bead core;

(f) applying a second body layer comprising at least one ply of rubber coated cord fabric and turning the outer edges of said second body layer down around the respective bead core;

(g) turning said major portion of said finishing strips up around the respective bead core such that said finishing strip covers the edge of said second body layer;

(h) applying rubber externally of said body layers to constitute the tread and sidewall portions of the completed tire;

(i) removing the assembled materials as a cylindrical uncured tire from the building drum; and (j) vulcanizing the uncured tire in a torodial configuration.

2. The method of defined in claim 1 wherein said first and second body layers have cords at an angle to the axis of rotation of said drum and said first body layer has cords at an angle opposite to the cord angle of said second layer.

3. The method as defined in claim 1 wherein the cords in said first layer are parallel to the cords in said second layer and the cords in both said first and said second layers are substantially axially oriented upon said drum.

4. The method as defined in claim 1 wherein the width of said minor portion of each of said finishing strip is from about 0.1 inch to about 1.0 inch.

* * * * *